United States Patent
Suzuki (10) Patent No.: US 9,591,291 B2
(45) Date of Patent: *Mar. 7, 2017

(54) IMAGING PROCESSING APPARATUS, IMAGE PROCESSING METHOD, AND PROGRAM (71) Applicant: SONY CORPORATION, Tokyo (JP)

(72) Inventor: Jun Suzuki, Chiba (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/869,412

(22) Filed: Sep. 29, 2015

(65) Prior Publication Data
US 2016/0021359 A1 Jan. 21, 2016

Related U.S. Application Data (63) Continuation of application No. 13/430,840, filed on Mar. 27, 2012, now Pat. No. 9,179,121.

(30) Foreign Application Priority Data

Apr. 11, 2011 (JP) .................. 2011-087211

(51) Int. Cl.
H04N 5/77 (2006.01)
H04N 13/02 (2006.01)
(Continued)

(52) U.S. Cl.
CPC ....... *H04N 13/0296* (2013.01); *G06T 7/0042* (2013.01); *G06T 11/60* (2013.01);
(Continued)

(58) Field of Classification Search
None
See application file for complete search history.

(56) References Cited

U.S. PATENT DOCUMENTS 9,179,121 B2 * 11/2015 Suzuki ............... H04N 13/0022
2005/0086000 A1 4/2005 Tsuchiya et al.
(Continued)

FOREIGN PATENT DOCUMENTS

CN 101959020 A 1/2011
EP 1 524 638 A1 4/2005
(Continued)

OTHER PUBLICATIONS

Extended Search Report issued Jul. 24, 2012 in European Application No. 12161409.3.
(Continued)

*Primary Examiner* — Eileen Adams
(74) *Attorney, Agent, or Firm* — Oblon, McClelland, Maier & Neustadt, L.L.P.

(57) ABSTRACT

An image processing apparatus includes: a subject detector that detects a predetermined subject in at least one of a first input image and a second input image between which parallax is present; and a combiner that combines a subject frame corresponding to the detected subject with each of the first and second input images stereoscopically displayed on a display section in such a way that the subject frames combined with the first and second input images also provide a depth sensation.

14 Claims, 6 Drawing Sheets (51) Int. Cl.
*H04N 13/00* (2006.01)
*G06T 7/00* (2006.01)
*G06T 11/60* (2006.01)
*H04N 5/232* (2006.01)

(52) U.S. Cl.
CPC ..... *H04N 5/23212* (2013.01); *H04N 5/23219* (2013.01); *H04N 13/0022* (2013.01); *H04N 13/0225* (2013.01); *G06T 2207/30204* (2013.01)

(56) References Cited

U.S. PATENT DOCUMENTS

| | | | | |
|---|---|---|---|---|
| 2005/0117215 | A1* | 6/2005 | Lange | G02B 27/22 359/462 |
| 2009/0103778 | A1 | 4/2009 | Yoshizumi et al. | |
| 2011/0012998 | A1 | 1/2011 | Pan | |
| 2011/0074928 | A1* | 3/2011 | Misawa | H04N 13/0018 348/47 |
| 2014/0009586 | A1* | 1/2014 | McNamer | H04N 13/021 348/50 |

FOREIGN PATENT DOCUMENTS

| | | |
|---|---|---|
| EP | 2 278 821 A2 | 1/2011 |
| JP | 2009-47498 | 3/2009 |
| JP | 2009-290255 | 12/2009 |
| JP | 2010-147940 | 7/2010 |
| JP | 2011-010128 | 1/2011 |
| JP | 2011-077900 | 4/2011 |
| JP | 2012-114896 | 6/2012 |

OTHER PUBLICATIONS

Japanese Office Action issued Dec. 16, 2014, in Patent Application No. 2011-087211.
Japanese Office Action issued Aug. 18, 2015 for Japanese Application No. 2011-087211.
Chinese Office Action issued Jun. 3, 2016 in Chinese Patent Application No. 201210096079.3 with translation.

* cited by examiner

IMAGING PROCESSING APPARATUS, IMAGE PROCESSING METHOD, AND PROGRAM

CROSS-REFERENCE TO RELATED APPLICATIONS

This application is a continuation of U.S. application Ser. No. 13/430,840, filed Mar. 27, 2012, which claims priority under 35 U.S.C. 119 to Japanese Patent Application No. 2011-087211, filed on Apr. 11, 2011, the entire contents of both of which are incorporated herein by reference.

FIELD

The present disclosure relates to an image processing apparatus, an image processing method, and a program.

BACKGROUND

As known image processing apparatus, there are still cameras, video camcorders, and other imaging apparatus that capture images of persons, landscapes, and other subjects. Some of the imaging apparatus described above capture images of a subject and stereoscopically (three-dimensionally) display the captured images of the subject on a display section. Looking at the displayed images, a user has a depth sensation.

Further, there is a known technology used with an imaging apparatus for detecting the face of a person (specific subject) and displaying a face frame corresponding to the detected face on a display section (see JP-A-2009-290255). The face frame is two-dimensionally displayed on the display section.

SUMMARY

When images are stereoscopically displayed on a display section, it is sometimes required to also display a face frame (subject frame). According to the technology described in JP-A-2009-290255, however, since a two-dimensional face frame is displayed on a three-dimensional image, the image having a depth is mixed with the face frame having no depth, which makes a user feel like something is wrong with the displayed image.

It is therefore desirable to provide an image processing apparatus, an image processing method, and a program that stereoscopically displays images on a display section and allows a user to naturally recognize a subject frame corresponding to a specific subject in the images.

An embodiment of the present disclosure is directed to an image processing apparatus including a subject detector that detects a predetermined subject in at least one of a first input image and a second input image between which parallax is present, and a combiner that combines a subject frame corresponding to the detected subject with each of the first and second input images stereoscopically displayed on a display section in such a way that the subject frames combined with the first and second input images also provide a depth sensation.

Another embodiment of the present disclosure is directed to an image processing method including detecting a predetermined subject in at least one of a first input image and a second input image between which parallax is present, and combining a subject frame corresponding to the detected subject with each of the first and second input images stereoscopically displayed on a display section in such a way that the subject frames combined with the first and second input images also provide a depth sensation.

Still another embodiment of the present disclosure is directed to a program that instructs a computer to carry out detecting a predetermined subject in at least one of a first input image and a second input image between which parallax is present, and combining a subject frame corresponding to the detected subject with each of the first and second input images stereoscopically displayed on a display section in such a way that the subject frames combined with the first and second input images also provide a depth sensation.

According to the embodiments of the present disclosure described above, when images are stereoscopically displayed on a display section, a user can naturally recognize a subject frame corresponding to a specific subject in the images.

DETAILED DESCRIPTION

A preferred embodiment of the present disclosure will be described below in detail with reference to the accompanying drawings. In the present specification and the drawings, components having practically the same functions have the same reference characters, and no redundant description thereof will be made.

The description will be made in the following order.
1. Configuration of image processing apparatus
2. Face frame combining processes
3. Selection of face frame combining process
4. Overview <1. Configuration of Image Processing Apparatus>

Figure 1:
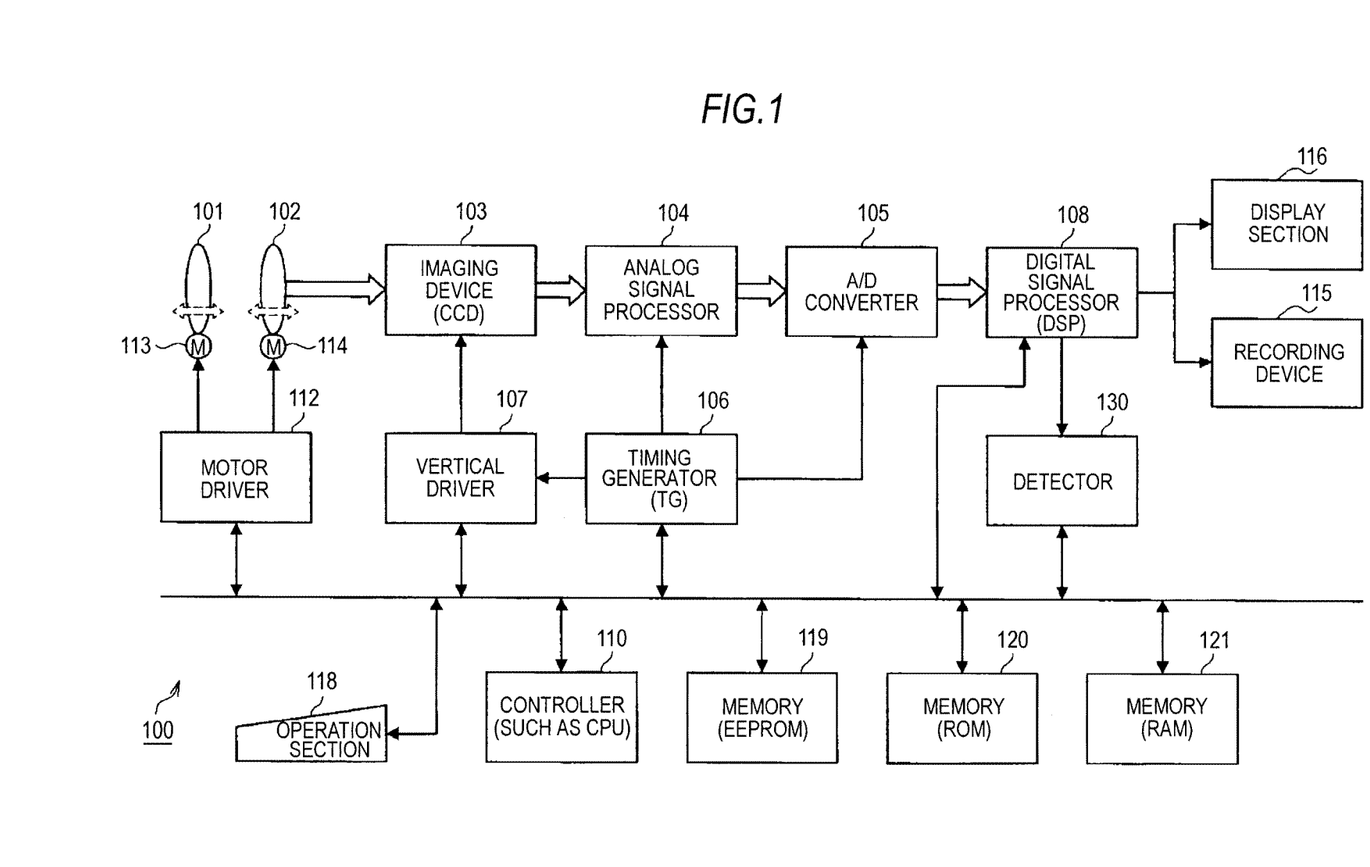
FIG. 1 is a block diagram showing the configuration of an imaging apparatus.

In the present embodiment, an imaging apparatus is presented by way of example of an image processing apparatus, and the configuration of an imaging apparatus 100 will be described with reference to FIG. 1. FIG. 1 is a block diagram showing the configuration of the imaging apparatus 100.

The imaging apparatus 100 is, for example, a video camcorder capable of capturing video images or a digital camera capable of capturing a still image.

The imaging apparatus 100 includes a focus lens 101, a zoom lens 102, an imaging device 103, an analog signal processor 104, an A/D converter 105, a timing generator 106, a vertical driver 107, a digital signal processor 108, a controller 110, a motor driver 112, a recording device 115, a display section 116, an operation section 118, an EEPROM 119, a ROM 120, a RAM 121, and a detector 130, as shown in FIG. 1.

The focus lens 101 is so moved forward or backward in the optical axis direction that a subject is brought into focus. The zoom lens 102 is so moved forward or backward in the optical axis direction that a captured image of the subject is magnified or demagnified to a desired size. The imaging device 103 is, for example, a CCD device or a CMOS device, and converts light incident through the focus lens 101 and the zoom lens 102 into an electric signal.

The analog signal processor 104 removes noise from the electric signal outputted from the imaging device 103 and performs other types of processing on the electric signal. The A/D converter 105 converts the signal produced by the imaging device 103 into a digital signal to produce raw image data.

The timing generator 106 produces control signals that control processing timings at which the imaging device 103 and the analog signal processor 104 perform processes. The vertical driver 107 drives the imaging device 103. The digital signal processor 108 performs image processing, such as light level gain correction and white balance adjustment, on the produced raw image data.

The controller 110 includes a CPU and runs a program stored in the ROM 120 or any other storage device to control a variety of processes performed by the imaging apparatus 100. The motor driver 112 drives a focus lens drive motor 113 provided in association with the focus lens 101 and a zoom lens drive motor 114 provided in association with the zoom lens 102.

The recording device 115 stores image data having undergone the image processing performed by the digital signal processor 108. The display section 116 displays live-view images and image data having undergone the image processing. The operation section 118 includes a release switch, a zoom button, and an operation button through which a user inputs a variety of operation-related information.

The EEPROM 119 is a nonvolatile memory and stores image data, a variety of pieces of auxiliary information, and programs. The ROM 120 stores, for example, programs and computation parameters used by the controller 110. The RAM 121 stores any of the programs used in the controller 110 and parameters changed as appropriate when the program is executed.

The detector 130 includes a sensor and analyzes image data inputted through the lenses. For example, the detector 130 functions as a depth detector that detects depth contained in the image data. The detector 130 further functions as a face detector that detects the face of a person in the image data. The controller 110, which controls an in-focus position, judges whether or not the position of the face detected by the detector 130 agrees with the in-focus position.

The imaging apparatus 100 can stereoscopically display captured images (video images or still images) (hereinafter also referred to as 3D display) on the display section 116. Specifically, the imaging apparatus 100 captures an image for the left eye and an image for the right eye between which parallax is present and displays the captured image for the left eye (referred to as left image for ease of description) and the captured image for the right eye (referred to as right image for ease of description) on the display section 116 for stereoscopic display. The user thus recognizes the images displayed on the display section 116 as images having depth information.

Although the focus lens 101, the zoom lens 102, and the imaging device 103 (the three components are collectively referred to as an imager) are separately drawn for ease of description in FIG. 1, the imaging apparatus 100, which is capable of stereoscopic display, actually includes an imager for capturing a left image and an imager for capturing a right image. The two imagers capture images between which parallax is present.

<2. Face Frame Combining Processes>

When images are stereoscopically displayed on the display section 116, it is sometimes required to also display a face frame. To meet the requirement described above, the display section 116, which stereoscopically displays images, needs to allow a user to recognize the face frame naturally. To meet the need, the imaging apparatus 100 according to the present embodiment carries out a face frame combining process that allows the depth of a subject (face, for example) and the depth of a subject frame (face frame, for example) recognized by the user to agree with each other.

In the present embodiment, as the face frame combining process, the imaging apparatus 100 first detects a predetermined subject (face, for example) in at least one of a first input image (left image, for example) and a second input image (right image, for example) between which parallax is present. The imaging apparatus 100 then combines a face frame corresponding to the detected face with each of the left and right images stereoscopically displayed on the display section 116 in such a way that the face frames combined with the left and right images also provide a depth sensation. According to the face frame combining process, since the depth of the face and the depth of the face frame recognized by the user agree with each other, the resultant displayed images are naturally recognized by the user.

The face frame combining process will be described below in detail with reference to a first face frame combining process, a second face frame combining process, and a third face frame combining process. In the present embodiment, the first face frame combining process corresponds to a first process, and the second or third face frame combining process corresponds to a second process.

(First Face Frame Combining Process)

The first face frame combining process will first be described. The first face frame combining process includes detecting the face of a person separately from left and right images that form stereoscopic images, combining a face frame with the left image based on the face detection performed on the left image, and combining a face frame with the right image based on the face detection performed on the right image.

Figure 2:
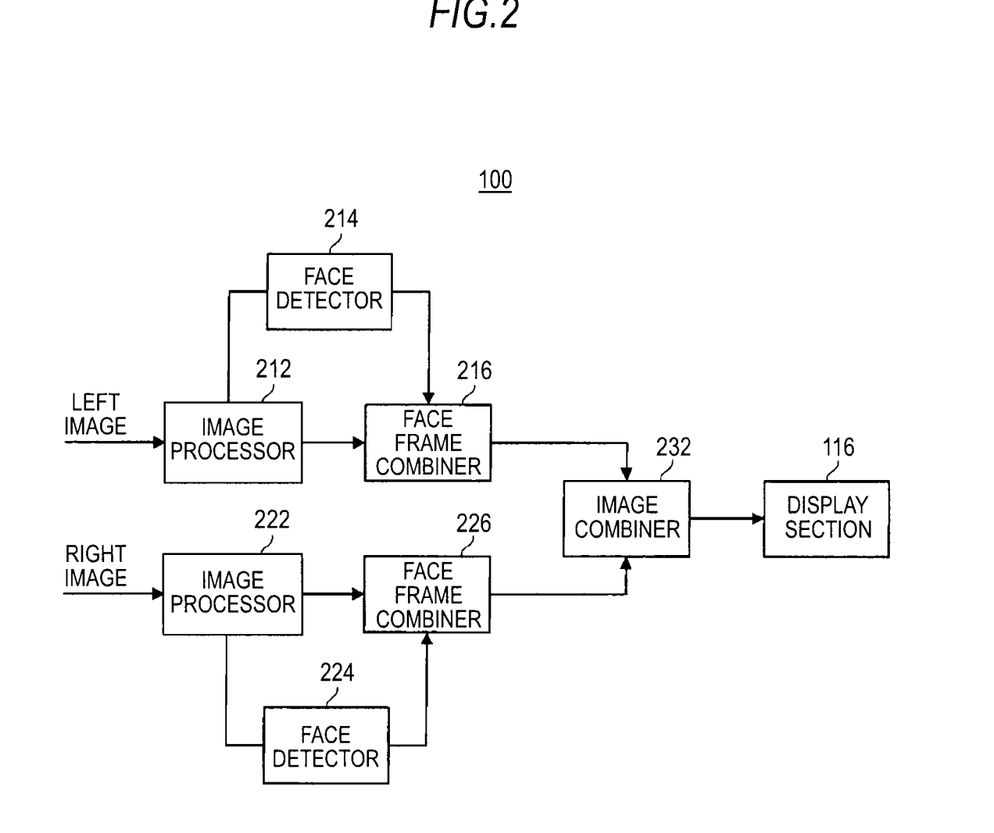
FIG. 2 is a functional block diagram of the imaging apparatus that performs a first face frame combining process.
Figure 3:
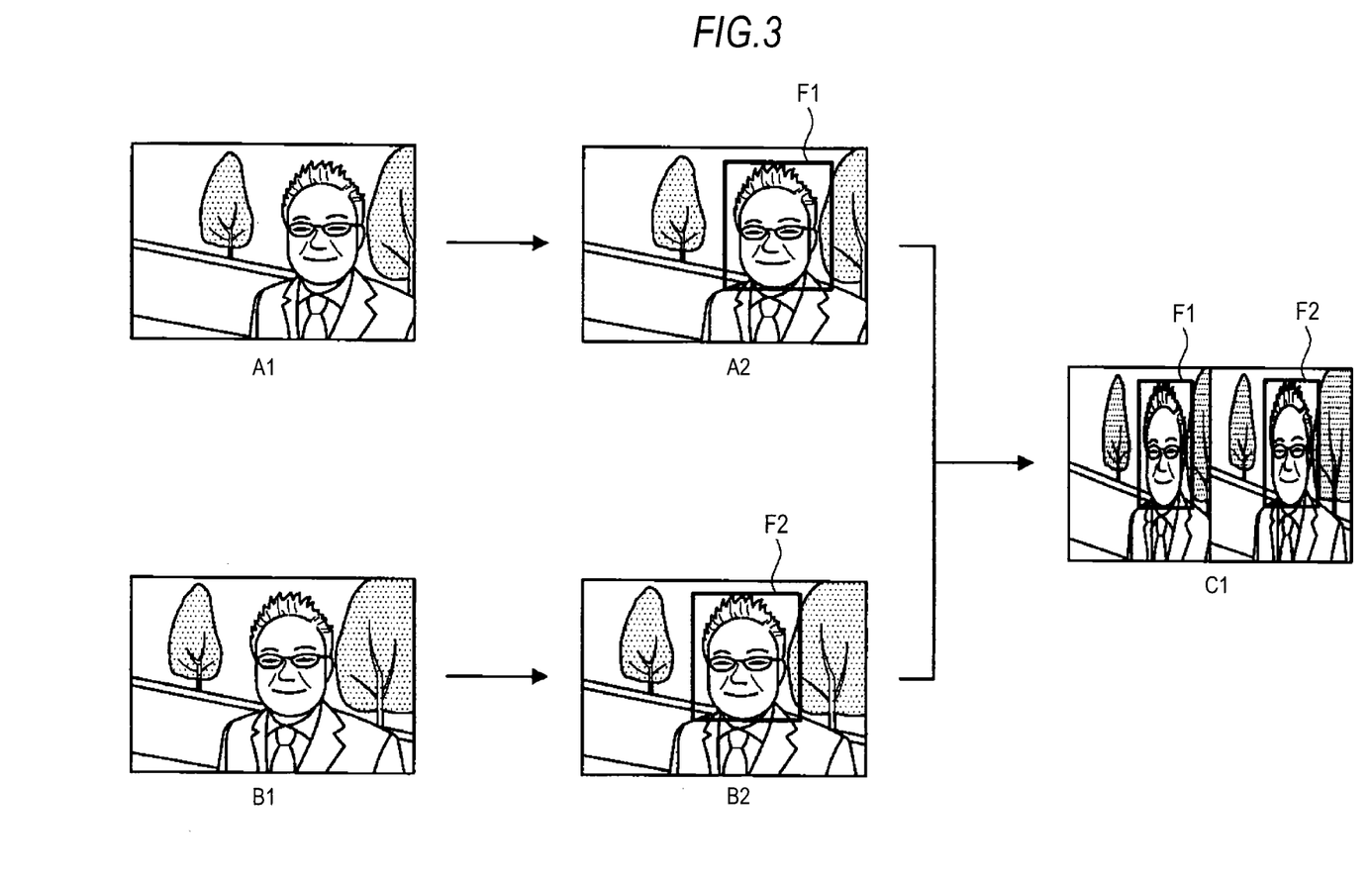
FIG. 3 is a diagram for describing the first face frame combining process.

The first face frame combining process will be described with reference to FIGS. 2 and 3. FIG. 2 is a functional block diagram of the imaging apparatus 100 that performs the first face frame combining process. FIG. 3 is a diagram for describing the first face frame combining process.

The imaging apparatus 100 includes an image processor 212, a face detector 214, a face frame combiner 216, an image processor 222, a face detector 224, a face frame combiner 226, and an image combiner 232, as shown in FIG. 2. The image processors 212 and 222, the face frame combiners 216 and 226, and the image combiner 232 are achieved by the digital signal processor 108 shown in FIG. 1, and the face detectors 214 and 224 are achieved by the detector 130 shown in FIG. 1.

Of the left and right images that form stereoscopic images, the imager for capturing a left image inputs data on the left image to the image processor 212. The image processor 212 performs a variety of types of image processing on the inputted left image and outputs a left image A1 shown in FIG. 3 having undergone the image processing to the face detector 214 and the face frame combiner 216.

The face detector 214 detects the face of a person (area corresponding to face) in the left image A1 inputted from the image processor 212. When a plurality of persons' faces are present in the left image, the face detector 214 detects a plurality of faces. The face detector 214 also detects the position of the face. The face detector 214 outputs the result of the face detection to the face frame combiner 216.

The face frame combiner 216 combines a face frame F1 with the left image A1 inputted from the image processor 212 based on the detection result from the face detector 214. That is, the face frame combiner 216 combines the face frame F1 corresponding to the face of the person with the left image A1 to produce a left image A2 shown in FIG. 3. The face frame combiner 216 outputs the left image A2 having the face frame F1 combined therewith to the image combiner 232.

The imager for capturing a right image inputs data on the right image that forms the stereoscopic images to the image processor 222. The image processor 222 performs a variety of types of image processing on the inputted right image and outputs a right image B1 shown in FIG. 3 having undergone the image processing to the face detector 224 and the face frame combiner 226. The right image B1 and the left image A1, which have been captured by the different imagers, have parallax therebetween.

The face detector 224 detects the face of the person (area corresponding to face) in the right image B1 inputted from the image processor 222. When a plurality of persons' faces are present in the right image, the face detector 224 detects a plurality of faces. The face detector 224 outputs the result of the face detection to the face frame combiner 226.

The face frame combiner 226 combines a face frame F2 with the right image B1 inputted from the image processor 222 based on the detection result from the face detector 224. That is, the face frame combiner 226 combines the face frame F2 corresponding to the face of the person with the right image B1 to produce a right image B2 shown in FIG. 3. The face frame combiner 226 outputs the right image B2 having the face frame F2 combined therewith to the image combiner 232.

The image combiner 232 combines the left image A2 inputted from the face frame combiner 216 with the right image B2 inputted from the face frame combiner 226 into a single frame C1 having the two images arranged side by side as shown in FIG. 3 (what is called side-by-side method). In the side-by-side method, the left image in the frame C1 is obtained by compressing the left image A2 in such a way that the horizontal width thereof is halved, and the right image in the frame C1 is obtained by compressing the right image B2 in such a way that the horizontal width thereof is halved. The image combiner 232 outputs the combined frame C1 to the display section 116 (FIG. 1).

Figure 4:
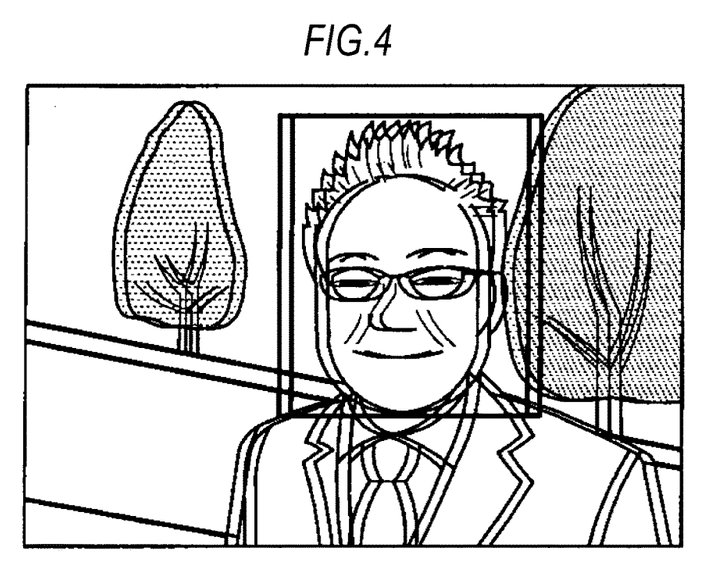
FIG. 4 is a diagrammatic view for describing stereoscopic images.

The display section 116 extends the horizontal width of each of the left and right images in the inputted frame C1 and sequentially displays them. In a period during which the left and right images are sequentially displayed, the user visually recognizes the right image with the right eye and the left image with the left eye, for example, through shuttering glasses. The imaging apparatus 100 may alternatively display the images by using what is called a polarization method and allow the user to visually recognize the right and left images. Since the right and left images containing the face frames have parallax therebetween, the user recognizes the depth of the face frame as well as that of the subject person, as shown in FIG. 4, which is a diagrammatic view for describing the stereoscopic images.

According to the first face frame combining process, since the left and right images have parallax therebetween, the face frame F1 combined with the left image and the face frame F2 combined with the right image also have parallax therebetween. Since the parallax between the face frame F1 and the face frame F2 is equal to that between the left and right images, the depth of the face of the person and the depth of the face frame recognized by the user agree with each other. As a result, the user can naturally recognize the face frame in the images stereoscopically displayed on the display section 116.

(Second Face Frame Combining Process)

A second face frame combining process will next be described. In the second face frame combining process, the face detection and the depth detection are first performed on a left or right image (left image in the following description). A face frame is then combined with the left image based on the result of the face detection performed on the left image, and a face frame is combined with the right image based on the face frame in the left image and the result of the depth detection performed on the left image.

Figure 5:
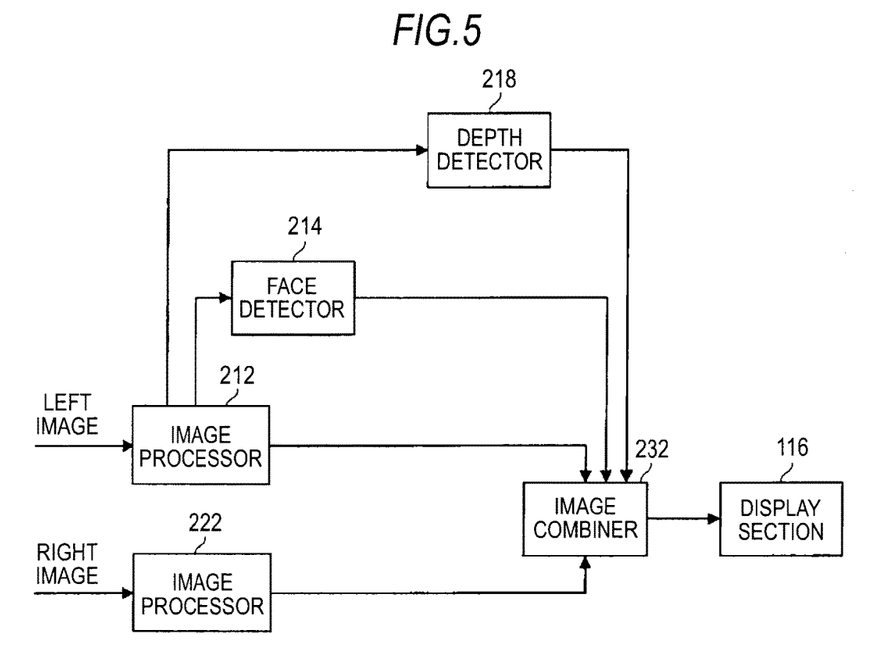
FIG. 5 is a functional block diagram of the imaging apparatus that performs a second face frame combining process.
Figure 6:
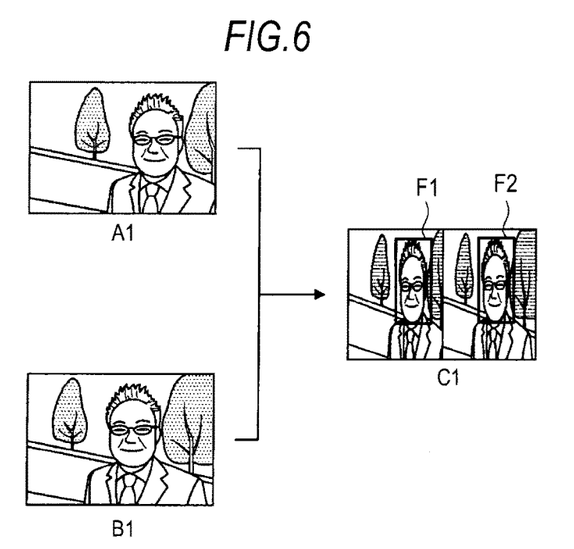
FIG. 6 is a diagram for describing the second face frame combining process.

The second face frame combining process will be described with reference to FIGS. 5 and 6. FIG. 5 is a functional block diagram of the imaging apparatus 100 that performs the second face frame combining process. FIG. 6 is a diagram for describing the second face frame combining process.

The imaging apparatus 100 includes an image processor 212, a face detector 214, a depth detector 218, an image processor 222, and an image combiner 232, as shown in FIG. 5. The image processors 212 and 222 and the image combiner 232 are achieved by the digital signal processor 108 shown in FIG. 1, and the face detector 214 and the depth detector 218 are achieved by the detector 130 shown in FIG. 1.

Of the left and right images that form stereoscopic images, data on the left image is inputted to the image processor 212. The image processor 212 performs a variety of types of image processing on the inputted left image and outputs a left image A1 shown in FIG. 6 having undergone the image processing to the face detector 214, the depth detector 218, and the image combiner 232.

The face detector 214 detects the face of a person (area corresponding to face) in the left image A1 inputted from the image processor 212. The face detector 214 outputs the result of the face detection to the image combiner 232.

The depth detector 218 detects the depth of the subject, such as the face, in the left image A1. For example, the depth detector 218 detects the depth of the subject by acquiring information on brightness contrast of the subject in the image. The depth detector 218 outputs the result of the depth detection to the image combiner 232.

Data on the right image that forms the stereoscopic images is inputted to the image processor 222. The image processor 222 performs a variety of types of image processing on the inputted right image and outputs a right image B1 shown in FIG. 6 having undergone the image processing to the image combiner 232.

The image combiner 232 produces a face frame F1 corresponding to the face detected in the left image A1 based on the detection result from the face detector 214 and combines the produced face frame F1 with the left image A1. The image combiner 232 further produces a face frame F2 corresponding to the right image B1 based on the face frame F1 corresponding to the face detected in the left image A1 and the depth detected by the depth detector 218. Specifically, the image combiner 232 acquires parallax based on the detected depth and produces the face frame F2 by shifting the face frame F1 by a distance corresponding to the acquired parallax. The image combiner 232 then combines the produced face frame F2 with the right image B1 (see FIG. 6).

Since parallax is determined based on the depth detected by the depth detector 218 in the second face frame combining process, no face detection is performed on the right image in the second face frame combining process, unlike in the first face frame combining process.

The image combiner 232 combines the left image combined with the face frame F1 with the right image combined with the face frame F2 into a single frame C1 having the two images arranged side by side as shown in FIG. 6 (side-by-side method described above). The image combiner 232 outputs the combined frame C1 to the display section 116.

The display section 116 extends the horizontal width of each of the left and right images in the inputted frame C1 and sequentially displays them. In a period during which the left and right images are sequentially displayed, the user visually recognizes the right image with the right eye and the left image with the left eye, for example, through shuttering glasses. Since the right and left images containing the face frames have parallax therebetween, the user recognizes the depth of the face frame as well as that of the subject person, as in FIG. 4 described above.

According to the second face frame combining process, the face frame F1 combined with the left image and the face frame F2 combined with the right image also have parallax therebetween, as in the first face frame combining process. Since the parallax between the face frame F1 and the face frame F2 is equal to that between the left and right images, the depth of the face of the person and the depth of the face frame recognized by the user agree with each other. As a result, the user can naturally recognize the face frame in the images stereoscopically displayed on the display section 116.

Since no face detection needs to be performed on a right image in the second face frame combining process as described above, the amount of processing can be reduced and the processing period can therefore be shortened as compared with those in the first face frame combining process.

(Third Face Frame Combining Process)

A third face frame combining process will next be described. In the third face frame combining process, the face detection is first performed on a left or right image (left image in the following description), and the depth detection is performed on both the left and right images. A face frame is then combined with the left image based on the result of the face detection performed on the left image, and a face frame is combined with the right image based on the face frame in the left image and the results of the depth detection performed on the left and right images.

Figure 7:
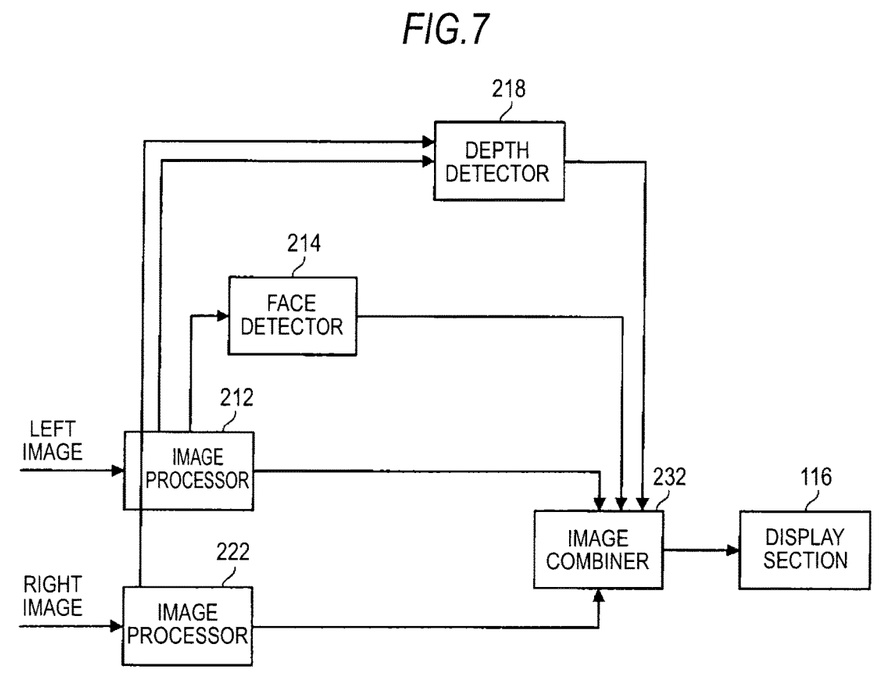
FIG. 7 is a functional block diagram of the imaging apparatus that performs a third face frame combining process.

The third face frame combining process will be described with reference to FIG. 7. FIG. 7 is a functional block diagram of the imaging apparatus 100 that performs the third face frame combining process.

The imaging apparatus 100 includes an image processor 212, a face detector 214, a depth detector 218, an image processor 222, and an image combiner 232, as shown in FIG. 7. The image processor 212, the face detector 214, and the image processor 222 in FIG. 7 have the same functions as those of the image processor 212, the face detector 214, and the image processor 222 in FIG. 5, and no description thereof will therefore be made.

The depth detector 218 detects the depth of a subject, such as a face, based on a left image A1 and a right image B1, unlike in the second face frame combining process, in which the depth is detected based only on the left image A1. For example, the depth detector 218 detects the depth of a subject by extracting a specific portion from the left image A1 and the corresponding specific portion from the right image B1 for block matching. The depth detector 218 outputs the result of the depth detection to the image combiner 232.

The image combiner 232 produces a face frame F1 corresponding to the face detected in the left image A1 based on the detection result from the face detector 214 and combines the produced face frame F1 with the left image A1. The image combiner 232 further produces a face frame F2 corresponding to the right image B1 based on the face frame F1 corresponding to the face detected in the left image A1 and the depth detected by the depth detector 218. The image combiner 232 then combines the produced face frame F2 with the right image B1 (see FIG. 6). Produced in consideration of the depth detected by the depth detector 218, the face frame F2 has parallax with respect to the face frame F1.

The image combiner 232 combines the left image combined with the face frame F1 with the right image combined with the face frame F2 into a single frame C1 having the two images arranged side by side as shown in FIG. 6 and outputs the combined frame C1 to the display section 116. The display section 116 sequentially displays the left image combined with the face frame F1 and the right image combined with the face frame F2, allowing not only the subject person but also the face frame to be displayed with depth information, as in FIG. 4 described above.

According to the third face frame combining process, the face frame F1 combined with the left image and the face frame F2 combined with the right image also have parallax therebetween, as in the second face frame combining process. Since the parallax between the face frame F1 and the face frame F2 is equal to that between the left and right images, the depth of the face of the person and the depth of the face frame recognized by the user agree with each other. As a result, the user can naturally recognize the face frame in the images stereoscopically displayed on the display section 116.

Further, according to the third face frame combining process, since depth is detected based on left and right images, the depth can be detected with higher precision than in the case where the depth is detected based only on one of the left and right images.

Three types of face frame combining process have been described above, but face frame combining processes that the imaging apparatus 100 can carry out are not limited thereto. Another face frame combining processes will be described with reference to FIG. 5 described above.

In another face frame combining process, the depth detector 218 detects depth by using continuous two left images. Since continuous two images are captured at different points of time, they are different from each other. In view of the fact, the depth detector 218 detects depth by using two left images captured at different points of time. For example, the depth detector 218 detects depth by extracting a specific portion from one of the two left images and the corresponding specific portion from the other left image and performing block matching. The image combiner 232 produces a face frame for a right image based on the detected depth and the result of the face detection performed on the left images. The thus produced face frame in the right image has parallax with respect to the face frame in the left image, as in the three face frame combining processes described above.

<3. Selection of Face Frame Combining Process>

A plurality of face frame combining processes that the imaging apparatus 100 can carry out have been described above. The controller 110 in the imaging apparatus 100 selects one of the plurality of face frame combining processes in accordance with how an image of a subject is captured and carries out the selected process. In this way, when images are stereoscopically displayed in real time, an optimum one of the plurality of face frame combining processes can be carried out in consideration of detection precision, such as in depth detection, and time necessary to carry out a face frame combining process.

For example, the controller 110 selects and carries out one of the plurality of face frame combining processes in accordance with whether or not the position of a detected face agrees with the in-focus position (central position in finder, for example) in the same plane. Specifically, the controller 110 selects and carries out the second face frame combining process when the position of a detected face agrees with the in-focus position in the same plane. On the other hand, the controller 110 selects and carries out the first or third face frame combining process when the position of a detected face does not agree with the in-focus position in the same plane.

Depth is detected more precisely when the position of a detected face agrees with the in-focus position in the same plane than when the position of a detected face does not agree with the in-focus position. In view of this fact, when the position of a face agrees with the in-focus position, depth detected based on a left or right image (second face frame combining process) is still precise enough, and the processing period can be shortened. On the other hand, when the position of a face does not agree with the in-focus position, detecting depth based on both left and right images (first or third face frame combining process) prevents precision in depth detection from decreasing.

Further, the controller 110 selects and carries out one of the three face frame combining processes, for example, in accordance with the number of faces detected by the face detector 214 (face detector 224). Specifically, the controller 110 selects and carries out the third face frame combining process when the number of detected faces is greater than a predetermined number, whereas selecting and carrying out the first face frame combining process when the number of detected faces is smaller than the predetermined number. The predetermined number is determined as follows: In view of the fact that the depth detector 218 detects depth in a fixed period, whereas the face detector 214 detects faces in a period proportional to the number of faces, the predetermined number is the smallest number of faces that makes the period necessary to detect the faces longer than the period necessary to detect the depth.

Selecting and carrying out one of the three face frame combining processes in accordance with the number of faces provides the following advantage: When the number of faces in an image increases, the amount of processing the controller 110 needs to perform increases. Since no face detection needs to be performed on a right image in the third face frame combining process, the amount of processing necessary in the third face frame combining process is smaller than that in the first face frame combining process, in which face detection is performed on a right image, when the number of faces to be detected increases. When the number of faces is large, selecting and carrying out the third face frame combining process therefore prevents the amount of processing necessary in the face frame combining process from increasing. On the other hand, when the number of faces is small, carrying out the first face frame combining process makes the parallax between a face frame F1 and a face frame F2 more precise.

(Specific Example of Selection of Face Frame Combining Process)

Figure 8:
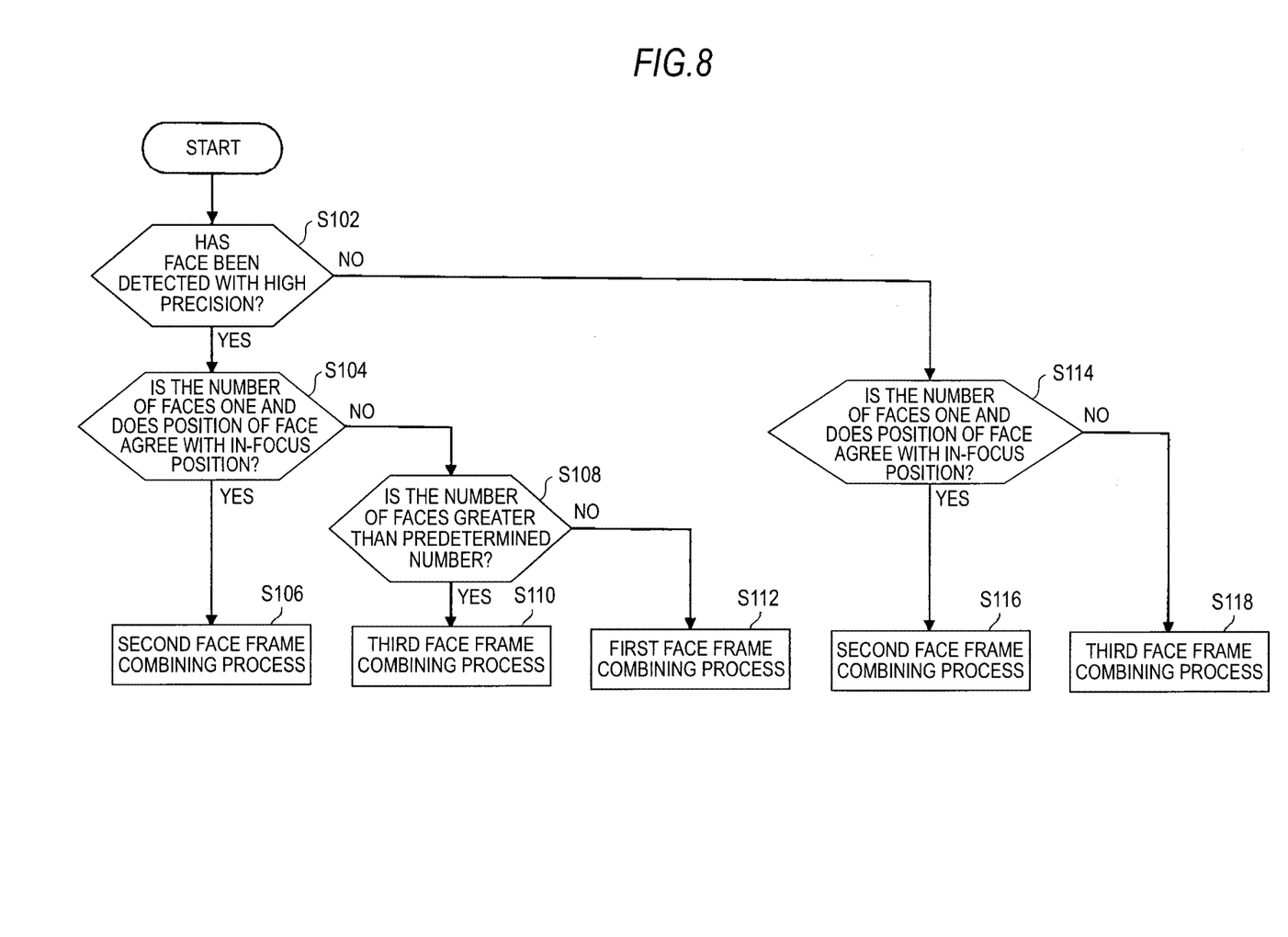
FIG. 8 is a flowchart for describing selection of a face frame combining process.

A specific example of the selection of a face frame combining process will be described with reference to FIG. 8. FIG. 8 is a flowchart for describing the selection of a face frame combining process. The controller 110 runs a program stored in the ROM 120 or any other storage device to carry out the procedure in the flowchart.

The flowchart in FIG. 8 starts at a point of time when the face detector 214 detects a face in an inputted left image. It is assumed in the following procedure that one of the first to third face frame combining processes is selected.

The controller 110 first judges whether or not the face detector 214 has detected a face with high precision (step S102). For example, the controller 110, which has in advance a value representing the degree of precision in face detection (threshold) or any other similar value, determines that the precision is high enough when the judged precision is higher than the threshold, whereas determining that the precision is not high enough when the judged precision is lower than the threshold.

When the judgment in step S102 shows that the precision in the face detection is high enough (Yes), the controller 110 judges whether or not the number of detected faces is one and the position of the detected face agrees with the in-focus position (step S104).

When the judgment in step S104 is Yes, the controller 110 carries out the second face frame combining process shown in FIG. 5 (step S106). In this way, the precision in depth detection can be increased, and the processing period can be shortened. When the judgment in step S104 is No, the controller 110 judges whether or not the number of detected faces is greater than the predetermined number (step S108).

When the judgment in step S108 shows that the number of faces is greater than the predetermined number (Yes), the controller 110 selects and carries out the third face frame combining process shown in FIG. 7 (step S110). Selecting and carrying out the third face frame combining process when the number of faces is large as described above prevents the amount of processing necessary in the face frame combining process from increasing as compared with a case where any of the other face frame combining processes is selected and carried out. When the judgment in step S108 shows that the number of faces is smaller than the predetermined number (No), the controller 110 selects and carries out the first face frame combining process shown in FIG. 2 (step S112). Carrying out the first face frame combining process increases the precision in the parallax between face frames F1 and F2.

When the judgment in step S102 shows that the precision in the face detection is not high enough (No), the controller 110 judges whether or not the number of detected faces is one and the position of the detected face agrees with the in-focus position (step S114).

When the judgment in step S114 is Yes, the controller 110 carries out the second face frame combining process (step S116). In this way, the precision in depth detection can be increased, and the processing period can be shortened. When the judgment in step S114 is No, the controller 110 carries out the third face frame combining process (step S118), which prevents precision in depth detection from decreasing.

According to the procedure described above, when images are stereoscopically displayed in real time, an optimum one of the plurality of face frame combining processes can be carried out in consideration of detection precision, such as in depth detection, and time necessary to carry out a face frame combining process.

<4. Overview>

As described above, the imaging apparatus 100 according to the present embodiment detects a predetermined subject (face, for example) in at least one of a first input image (left image, for example) and a second input image (right image, for example) between which parallax is present. The imaging apparatus 100 then combines a face frame corresponding to the detected face with each of the left and right images stereoscopically displayed on the display section 116 in such a way that the face frames combined with the left and right images also provide a depth sensation.

Since the face frame combining process described above allows two images that form stereoscopic images to be combined with two face frames corresponding to the parallax between the two images, the depth of the subject and the depth of the subject frame recognized by the user agree with each other. As a result, when the images are stereoscopically displayed on the display section 116, the user can naturally recognize the subject frame.

A preferred embodiment of the present disclosure has been described in detail with reference to the accompanying drawings, but the present disclosure is not limited to the embodiment. Those who are adequately skilled in the technical field of the present disclosure can obviously come up with a variety of changes and modifications within the range of technical spirit set forth in the appended claims, and these changes and modifications, of course, fall within the technical scope of the present disclosure.

The above description has been made with reference to the face of a person as a subject, but the subject is not limited thereto. For example, the subject may alternatively be a person as a whole, a pet, a plant, and any other specific object.

The above description has been made with reference to an imaging apparatus, such as a video camcorder, as an image processing apparatus, but the image processing apparatus is not limited thereto. For example, the image processing apparatus may be any apparatus that has a function of stereoscopically displaying image data on a display section, such as a mobile phone, a PDA, a game console, an electronic dictionary, and a notebook personal computer. The image processing apparatus may alternatively display images on an external display device.

The steps shown in the flowchart of the embodiment described above include not only processes performed in time series in the described order but also processes performed not necessarily in time series but concurrently or individually. The steps carried out in time series in the above description can, of course, be carried out in other orders as appropriate in some cases.

The present disclosure may also be implemented as the following configurations.

(1) An image processing apparatus including
a subject detector that detects a predetermined subject in at least one of a first input image and a second input image between which parallax is present, and
a combiner that combines a subject frame corresponding to the detected subject with each of the first and second input images stereoscopically displayed on a display section in such away that the subject frames combined with the first and second input images also provide a depth sensation.

(2) The image processing apparatus described in (1), wherein the subject detector detects a face of the subject, and
the subject frame is a face frame corresponding to the face.

(3) The image processing apparatus described in (1) or (2), wherein the combiner combines
not only a first subject frame corresponding to the subject detected in the first input image with the first input image
but also a second subject frame corresponding to the subject detected in the second input image with the second input image.

(4) The image processing apparatus described in (1) or (2), further including
a depth detector that detects depth of the subject based on the first input image,
wherein the combiner combines
not only a first subject frame corresponding to the subject detected in the first input image with the first input image
but also a second subject frame produced based on the first subject frame and the depth detected by the depth detector with the second input image.

(5) The image processing apparatus described in (1) or (2), further including a depth detector that detects depth of the subject based on the first and second input images,
wherein the combiner combines
not only a first subject frame corresponding to the subject detected in the first input image with the first input image
but also a second subject frame produced based on the first subject frame and the depth detected by the depth detector with the second input image.

(6) The image processing apparatus described in any of (1) to (4), further including
a depth detector that detects depth of the subject based on the first input image, and
a controller that chooses and carries out one of
a first process in which the combiner combines not only a first subject frame corresponding to the subject detected in the first input image with the first input image but also a second subject frame corresponding to the subject detected in the second input image with the second input image, and
a second process in which the combiner combines not only a first subject frame corresponding to the subject detected in the first input image with the first input image but also a second subject frame produced based on the first subject frame and the depth detected by the depth detector with the second input image.

(7) The image processing apparatus described in (6), wherein the controller chooses and carries out the second process when the number of subjects detected by the subject detector is greater than a predetermined number, whereas choosing and carrying out the first process when the number of subjects detected by the subject detector is smaller than the predetermined number.

(8) The image processing apparatus described in (6), wherein the controller detects an in-focus position in an input image and the position of the detected face, and
the controller chooses and carries out the second process when the in-focus position agrees with the position of the subject, whereas choosing and carrying out the first process when the in-focus position does not agree with the position of the subject.

(9) An image processing method including
detecting a predetermined subject in at least one of a first input image and a second input image between which parallax is present, and
combining a subject frame corresponding to the detected subject with each of the first and second input images stereoscopically displayed on a display section in such a way that the subject frames combined with the first and second input images also provide a depth sensation.

(10) A program that instructs a computer to carry out
detecting a predetermined subject in at least one of a first input image and a second input image between which parallax is present, and
combining a subject frame corresponding to the detected subject with each of the first and second input images stereoscopically displayed on a display section in such a way that the subject frames combined with the first and second input images also provide a depth sensation.

The present disclosure contains subject matter related to that disclosed in Japanese Priority Patent Application JP 2011-087211 filed in the Japan Patent Office on Apr. 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
circuitry configured to detect a predetermined subject in a first input image or a second input image, a parallax being present between the first input image and the second input image,
and control a display to display subject markers for the first input image and the second input image, the subject markers corresponding to the detected predetermined subject detected in the first input image or the second input image between which the parallax is present, and control the display to provide a depth perception via the display such that a parallax of the subject markers visually corresponds to a parallax of the detected predetermined subject detected in the first input image or the second input image between which the parallax is present.

2. The image processing apparatus according to claim 1, wherein the circuitry is further configured to detect a face of the predetermined subject, and a subject marker is a face marker corresponding to the detected face.

3. The image processing apparatus according to claim 1, wherein the circuitry combines not only a first subject marker corresponding to the predetermined subject detected in the first input image with the first input image but also a second subject marker corresponding to the predetermined subject detected in the second input image with the second input image.

4. The image processing apparatus according to claim 1, wherein the circuitry is further configured to
detect depth of the predetermined subject based on the first input image, and
combine not only a first subject marker corresponding to the predetermined subject detected in the first input image with the first input image, but also a second subject marker produced based on the first subject marker and the depth detected by the circuitry with the second input image.

5. The image processing apparatus according to claim 1, wherein the circuitry is further configured to
detect depth of the predetermined subject based on the first and second input images, and
combine not only a first subject marker corresponding to the predetermined subject detected in the first input image with the first input image, but also a second subject marker produced based on the first subject marker and the depth detected by the circuitry with the second input image.

6. The image processing apparatus according to claim 1, wherein the circuitry is further configured to
detect depth of the subject based on the first input image, and
choose and carry out one of
a first process in which the circuitry combines not only a first subject marker corresponding to the predetermined subject detected in the first input image with the first input image but also a second subject marker corresponding to the predetermined subject detected in the second input image with the second input image, and
a second process in which the circuitry combines not only a first subject marker corresponding to the predetermined subject detected in the first input image with the first input image but also a second subject marker produced based on the first subject marker and the depth detected by the circuitry with the second input image.

7. The image processing apparatus according to claim 6, wherein the circuitry is further configured to
detect an in-focus position in an input image and position of the detected predetermined subject, and
choose and carry out the second process when the in-focus position corresponds to the position of the predetermined subject, and choose and carry out the first process when the in-focus position does not correspond to the position of the predetermined subject.

8. The image processing apparatus according to claim 1, wherein the circuitry controls the display to display the subject markers in a position corresponding to a position of the detected predetermined subject.

9. The image processing apparatus according to claim 1, wherein the circuitry performs a shift process of the subject markers in a lateral direction to provide the depth perception.

10. The image processing apparatus according to claim 1, wherein the circuitry is further configured to
detect a position of a focus lens for imaging the first input image or the second input image, and
determine disparity of the predetermined subject based on the position of the focus lens.

11. The image processing apparatus according to claim 1, wherein the circuitry is further configured to generate the subject markers based on the depth of the detected predetermined subject.

12. The image processing apparatus according to claim 1, wherein the circuitry is configured to detect the predetermined subject in both the first input image and the second input image between which the parallax is present.

13. An image processing method comprising:
detecting a predetermined subject in a first input image or a second input image, a parallax being present between the first input image and the second input image; and
controlling a display to display subject markers for the first input image and the second input image, the subject markers corresponding to the detected predetermined subject detected in the first input image or the second input image between which the parallax is present, and controlling the display to provide a depth perception via the display such that a parallax of the subject markers visually corresponds to a parallax of the detected predetermined subject detected in the first input image or the second input image between which the parallax is present.

14. A non-transitory computer-readable storage medium including computer executable instructions, wherein the instructions, when executed by a computer, cause the computer to perform a method, the method comprising:
  detecting a predetermined subject in a first input image or a second input image, a parallax being present between the first input image and the second input image; and
  controlling a display to display subject markers for the first input image and the second input image, the subject markers corresponding to the detected predetermined subject detected in the first input image or the second input image between which the parallax is present, and controlling the display to provide a depth perception via the display such that a parallax of the subject markers visually corresponds to a parallax of the detected predetermined subject detected in the first input image or the second input image between which the parallax is present.

* * * * *